United States Patent
Abdulqader et al.

(10) Patent No.: US 12,495,382 B2
(45) Date of Patent: Dec. 9, 2025

(54) LOCATING AND TRACKING IN PRIVATE NEXT GENERATION NETWORKS

(71) Applicant: Intel Corporation, Santa Clara, CA (US)

(72) Inventors: Majdi Abdulqader, Moss Beach, CA (US); Marcos E. Carranza, Portland, OR (US); Francesc Guim Bernat, Barcelona (ES); Cesar Martinez-Spessot, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 17/851,588

(22) Filed: Jun. 28, 2022

(65) Prior Publication Data

US 2022/0408401 A1    Dec. 22, 2022

(51) Int. Cl.
*H04L 1/00* (2006.01)
*H04W 4/33* (2018.01)
*H04W 4/38* (2018.01)
*H04W 64/00* (2009.01)

(52) U.S. Cl.
CPC .............. *H04W 64/00* (2013.01); *H04W 4/33* (2018.02); *H04W 4/38* (2018.02)

(58) Field of Classification Search
CPC ......... H04W 64/00; H04W 4/33; H04W 4/38; G01S 5/02524; G01S 5/0258; G01S 5/02521

USPC ....................................................... 455/422.1
See application file for complete search history.

(56) References Cited

U.S. PATENT DOCUMENTS

| 9,014,718 | B2 * | 4/2015 | Yang | ...................... H04W 4/33 |
| | | | | 455/456.1 |
| 2020/0053690 | A1 * | 2/2020 | Fischer | ................. G01S 5/0236 |

FOREIGN PATENT DOCUMENTS

| CA | 3171443 A1 * | 9/2021 | ......... G08B 21/0272 |
| WO | WO-2022011045 A1 * | 1/2022 | ............ H04W 64/00 |

\* cited by examiner

*Primary Examiner* — Tanmay K Shah
(74) *Attorney, Agent, or Firm* — Schwegman Lundberg & Woessner, P.A.

(57) ABSTRACT

An apparatus and system are described to provide indoor positioning and movement information using a private next generation (NG) network. A heatmap of pathloss vs distance from a remote radio unit (RRU) is provided from the UE and federated with other heatmaps from different UEs under similar conditions. The federated heatmap is provided to the UE. A private location server containing an AI module is trained using data from the UEs. The location and movement of the UE is determined to a particular pixel based on the heatmap. WiFi reference points (RP) are used if multiple pixels satisfy data of the heatmap.

23 Claims, 10 Drawing Sheets

LOCATING AND TRACKING IN PRIVATE NEXT GENERATION NETWORKS

TECHNICAL FIELD

Embodiments pertain to next generation wireless communications. In particular, some embodiments relate to location determination in private next generation (NG) networks, such as $5^{th}$ generation (5G) networks.

BACKGROUND

The use and complexity of wireless systems, which include 5G public and private networks among others, has increased due to both an increase in the number and types of user equipment (UE) using network resources. The amount and variation in data and bandwidth usage by various applications operating on these UEs, such as streaming, gaming and sensor information, also increasing the difficulty in designing such systems. One such issue that has arisen is UE location determination in 5G networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
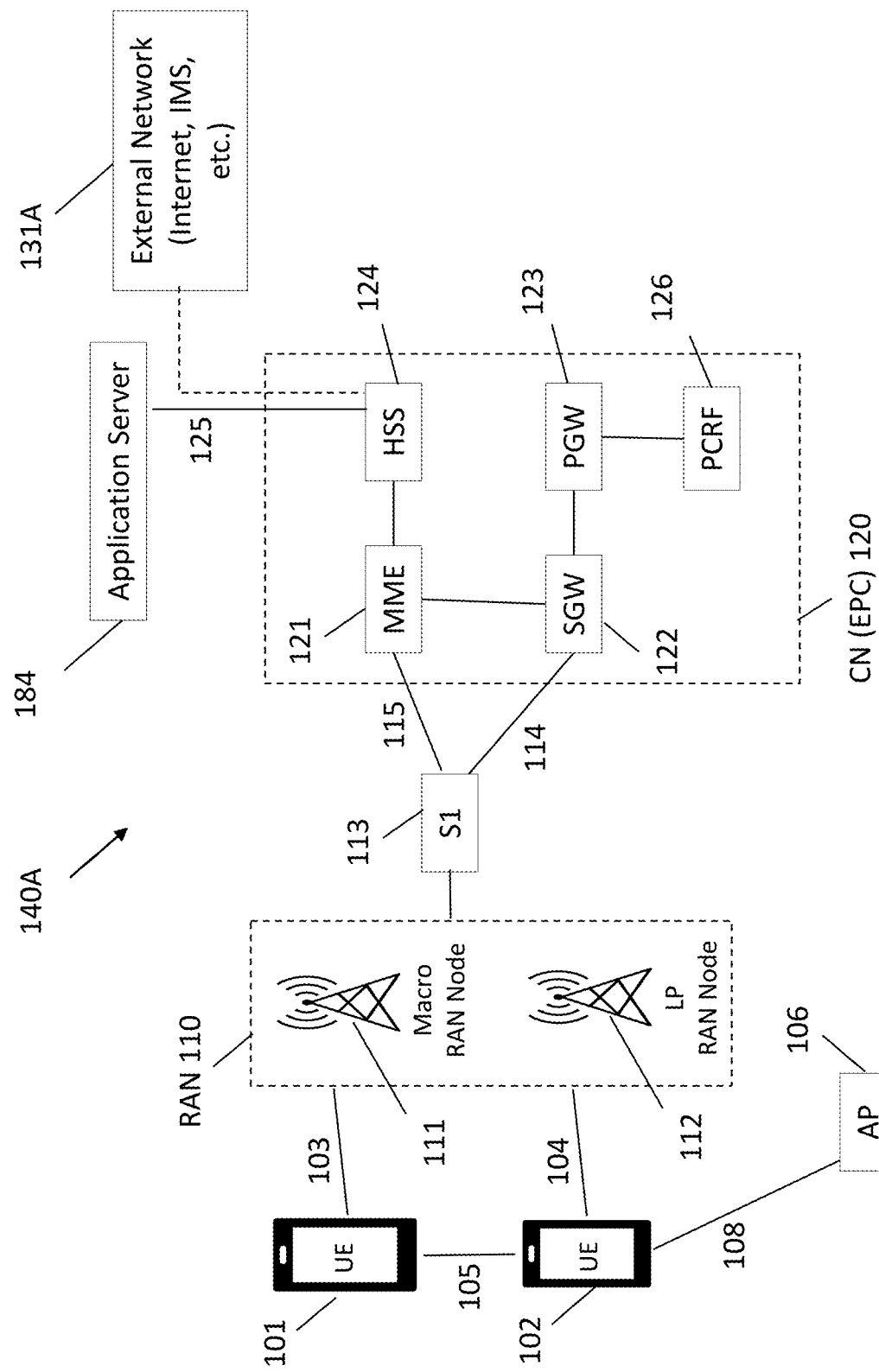
FIG. 1A illustrates an architecture of a network, in accordance with some aspects.

FIG. 1A illustrates an architecture of a network in accordance with some aspects. Note that while the network 140A generally shows the architecture of a next generation (NG) public network, one or more elements of the public NG network may be present in a private 5G network, as discussed in more detail below. The NG network may include one or more of a 5G network, 6G network, or any later generation network (or devices); thus, although private 5G networks are described primarily herein, the various embodiments may be applicable to some or all private NG networks. The network 140A includes 3GPP LTE/4G and NG network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 may comprise an Internet-of-Things (IoT) UE or a Cellular IoT (CIoT) UE, which may comprise a network access layer designed for low-power IoT applications utilizing short-lived UE connections. In some aspects, any of the UEs 101 and 102 may include a narrowband (NB) IoT UE (e.g., such as an enhanced NB-IoT (eNB-IoT) UE and Further Enhanced (FeNB-IoT) UE). An IoT UE may utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 may include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, a Wi-Fi protocol, and the like. Accordingly, the UEs 101 and 102 may contain both a 3GPP (5G) modem and a separate Wi-Fi modem.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 108. The connection 108 may comprise a local wireless connection, such as, for example, a connection consistent with any IEEE 802.11 protocol, according to which the AP 106 may comprise a wireless fidelity (WiFi®) router. In this example, the AP 106 is shown to be connected to the Internet without connecting to the core network of the wireless system (described in further detail below).

The RAN 110 may include one or more access nodes that enable the connections 103 and 104. These access nodes (ANs) may be referred to as base stations (BSs), NodeBs, evolved NodeBs (eNBs), Next Generation NodeBs (gNBs), RAN nodes, and the like, and may comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs may function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 may terminate the air interface protocol and may be the first point of contact for the UEs 101 and 102. In some aspects, any of the RAN nodes 111 and 112 may fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 may provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 may also communicate data to other external networks 131A, which may include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 may also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations may include techniques for sidelink resource allocation and UE processing behaviors for NR sidelink V2X communications.

An NG system architecture (or 6G system architecture) may include the RAN 110 and a 5G core network (5GC) 120. The NG-RAN 110 may include a plurality of nodes, such as gNBs and NG-eNBs. The CN 120 (e.g., a 5G core network/5GC) may include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture may use reference points between various nodes. In some aspects, each of the gNBs and the NG-eNBs may be implemented as a base station, a mobile edge server, a small cell, a home eNB, and so forth. In some aspects, a gNB may be a master node (MN) and NG-eNB may be a secondary node (SN) in a 5G architecture.

Figure 1B:
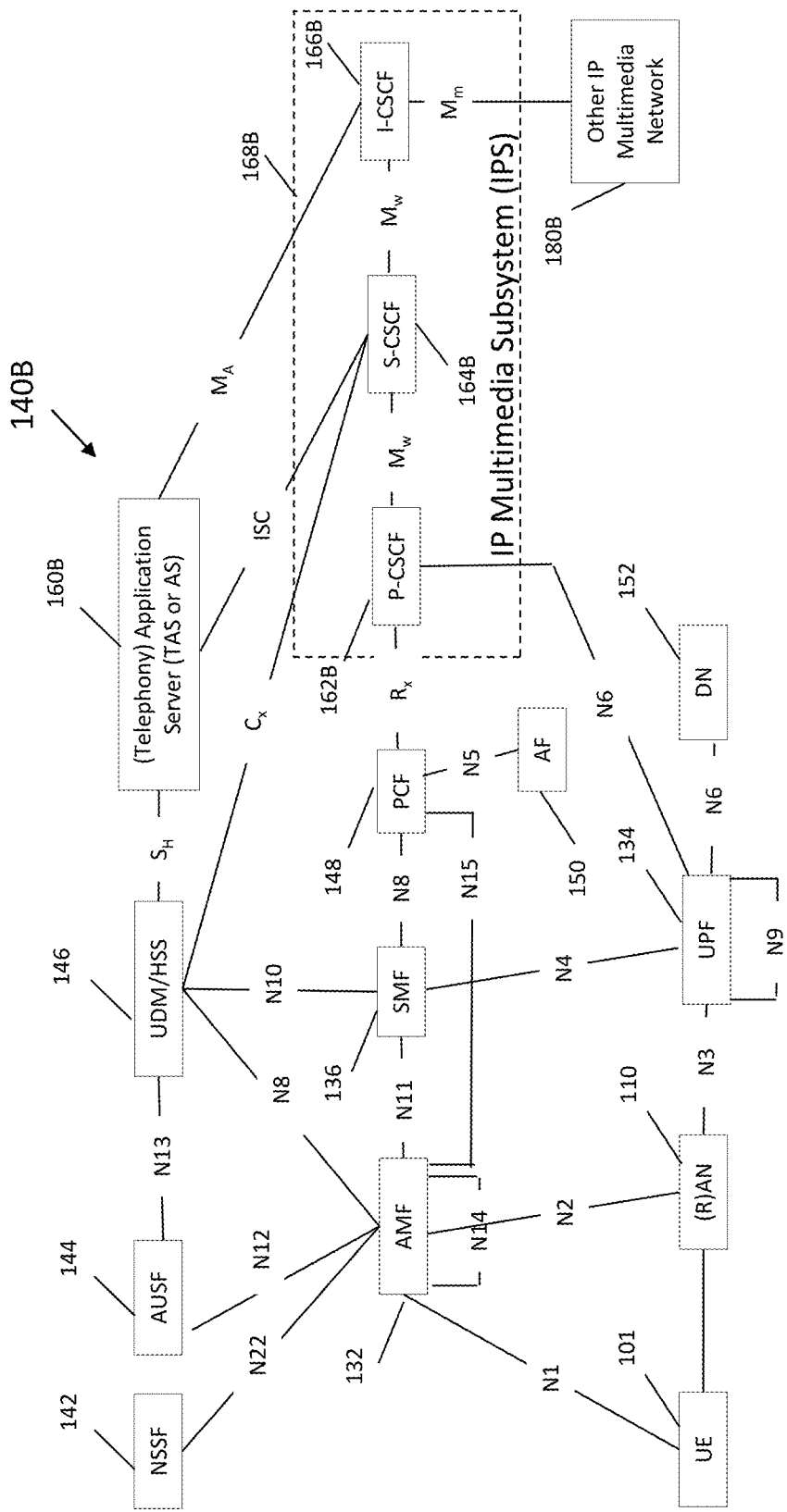
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 may provide a connection to a data network (DN) 152, which may include, for example, operator services, Internet access, or third-party services. The AMF 132 may be used to manage access control and mobility and may also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which may act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 180B, e.g. an IMS operated by a different network operator.

In some aspects, the UDM/HSS 146 may be coupled to an application server, which may include a telephony application server (TAS) or another application server (AS). The AS 160B may be coupled to the IMS 168B via the S-CSCF 164B or the I-CSCF 166B.

A reference point representation shows that interaction may exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B may also be used.

Figure 1C:
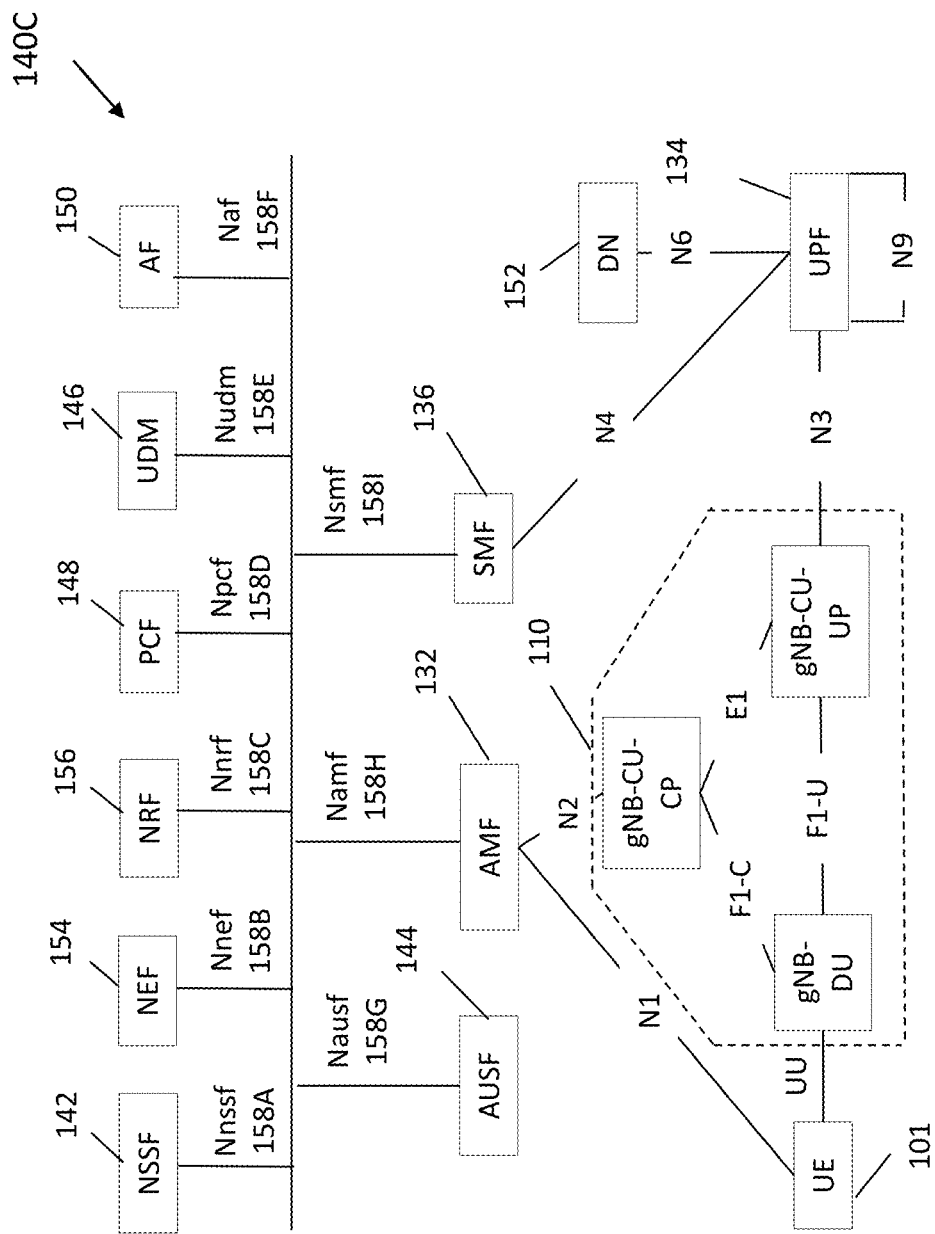
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C may also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C may include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C may also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
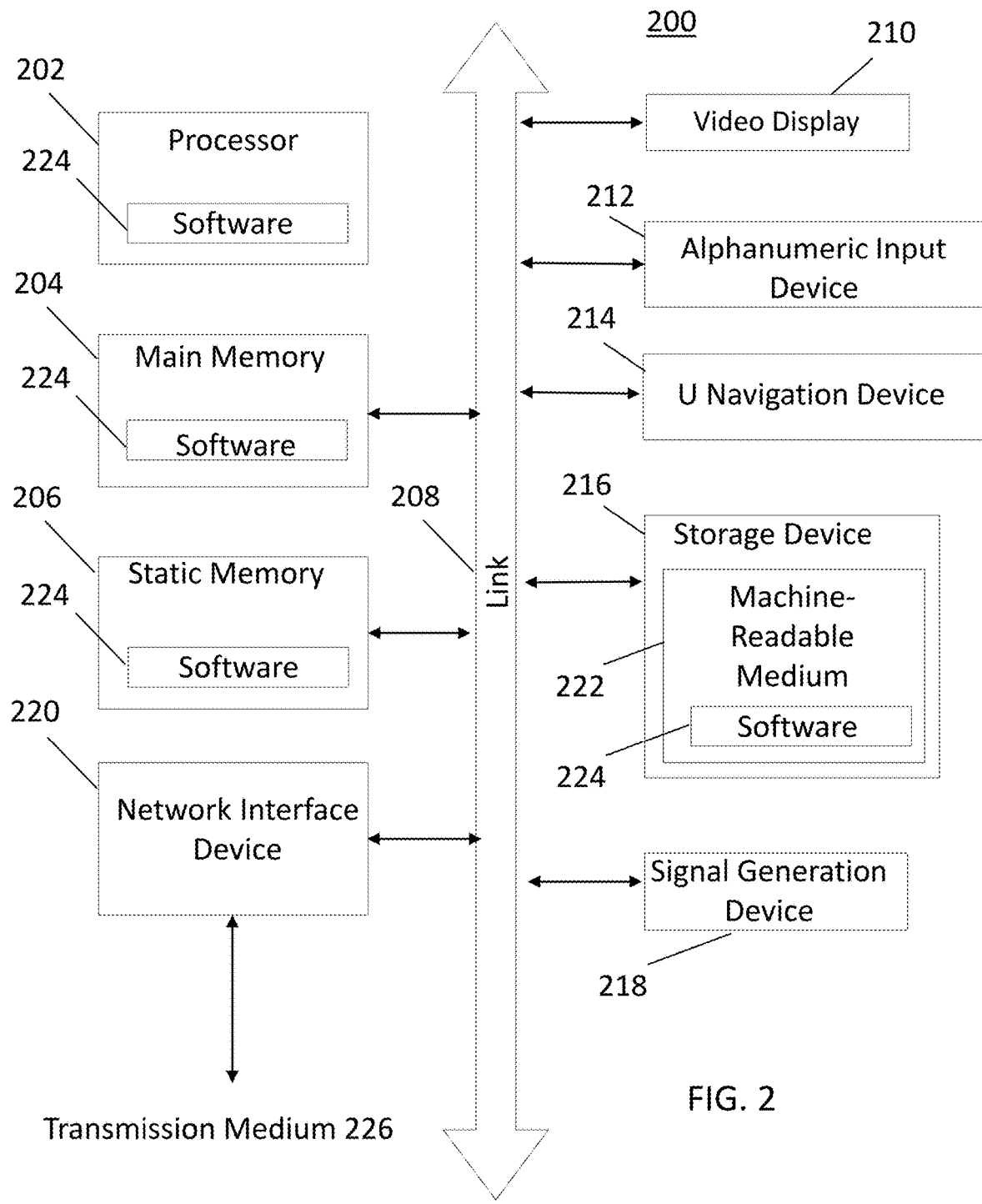
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processor circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage, non-removable storage, volatile memory, or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, NG (e.g., 5G) standards among others. In an example, the network interface device 220 may include one or more physical jacks (e.g., Ethernet, coaxial, or phone jacks) or one or more antennas to connect to the transmission medium 226.

Note that the term "circuitry" (e.g., processing circuitry) as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein may also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein may also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs— note that this term is typically used in the context of 3GPP 5G and 6G communication systems, etc. Still, a UE may take this role as well and act as an AP, eNB, or gNB; that is some or all features defined for network equipment may be implemented by a UE.

As above, use of sensors and other wireless devices in NR networks has spurred the growth of use of such networks. This growth includes both public and private 5G NR networks, the latter of which is used by enterprises such as in warehouses, hospitals, offices, schools, or factories. The increase in private 5G NR (and edge) networks by various enterprises has created an increased demand for higher performance, low latency, smart edge capabilities, and security connections that compare to what a Wi-Fi service may offer. Locating and tracking is desired for a variety of internet-of-things (IoT) and artificial intelligence (AI) applications.

One use case that has been of particular import in 5G networks is tracking of various types, which is widely used in multiple edge deployments. Physical tracking use cases include, for example, location-based UE services (e.g., maps, augmented reality), micro-mobility services (e.g., vehicular location), infrastructure services (e.g., tracking of infrastructure such as trains), and logistics services (e.g., tracking commercial vehicles and other assets over large geographical distances). In addition, tracking may involve UE tracking for interference monitoring, autonomous navigation, and IoT tracking (e.g., sensors for human and other activity, utility tracking), among many others. These tracking uses may involve monitoring expensive equipment that in the past disappear without any option of traceability or tracking as well as roadblock monitorization to identify accidents or changes in the infrastructure.

One particular tracking application whose use has exploded recently is the rise of automated systems for tracking and moving inventory in an indoor location (i.e., a geographical area surrounded by walls and a roof) that use a private 5G network. However, the location precision in private 5G networks may be more problematic that in 5G public networks. Notably, private 5G networks may transmit at relatively high power compared to 5G public networks and cover large areas without the benefit of location techniques—most notably GPS, due to the indoor use of such networks. For example, a UE moving from an outdoor environment to an indoor environment may retain the last determined outdoor GPS data. Nor is 5G-NR triangularity (the use of multiple transmitters/sites, usually gNBs, to perform location calculations) generally usable in private deployments due to the typical use of a single isolated site in the facility. In addition, however, because triangulation generally uses timing advances (TAs) from the different transmitters, the accuracy may be insufficient for current applications—that is, in many cases the accuracy (a few hundreds of meters) may exceed the size of the warehouse in which the tracking of the inventory occurs.

Another issue arises in the case of a 911 emergency call from a mobile UE in indoor locations. The FCC mandates that for E911 calls from mobile devices, the location must be accurate up to about 3 meters. Such accuracy is not available in private 5G networking as site address is the only shared information with a 911 agent when the 5G private site is commissioned for service. Thus, locating and tracking may be used not only to locate and track the movement of individuals for E911 or commercial purposes (e.g., for advertising purposes), but also to track the movement of other UEs such as vehicles, machines, containers, and products moving in a warehouse or from building to another building.

In some cases, in addition to the use of sites, Wi-Fi APs may be used to provide triangulation. Wi-Fi triangularity may involve determining location based on the Received Signal Strength Indicator (RSSI) (or signal-to-noise ratio (SNR) or signal-to-interference-noise ratio (SINR)) from a signal received from multiple Wi-Fi APs to estimate the distance from each Wi-Fi AP and thus triangulate a particular location. The accuracy, however, may depend on both the RSSI type (Line-Of-Sight (LOS)/Non-Line-Of-Sight (NLOS)) and value. A simulation of predicted accuracy for LOS measurements resulted in an accuracy for 75% of the samples of more than 5 meters especially at a (typical) lower RSSI (about −60 to about −80 dBm); a simulation of predicted accuracy for NLOS measurements resulted in an accuracy for 75% of samples of more than 7.2 meters at lower RSSI values. These results may deteriorate further due to the increased background noise, interference, and reflections with an increased density of Wi-Fi APs and corresponding increased traffic. NLOS measurements are more likely to occur in an indoor environment due to various obstacles and wall between the Wi-Fi AP and UE, however, triangulation based on neither the LOS nor NLOS measurements may be able to be used in typical enterprise environments in which robots/vehicles are used due to the distance between containers (e.g., shelves), corridors, and vehicles, which may be substantially less than 5 meters. In typical situations, accuracy to less than 1 meter is desired, notably as the typical distance between walls in a corridor traveled by robots is about 1 meter (and the robots travel at speeds of up to about 9 mph). Note that in some embodiments, there is a tradeoff between location accuracy (which may be linked to reporting frequency) and a maximum speed being traveled by the UE, although this limitation, for example, should not be problematic at indoor speeds traveled by robots to obtain the desired accuracy for the robot and avoid collisions even in environments in which tens or even hundreds of robots are present and moving around.

Bluetooth may also be used to aid in location determination. In particular, Bluetooth Low Energy (BLE) beacons may also be used. Due to the transmission range, the BLE beacon density used to provide the desired accuracy is impractical in most situations.

Similarly, reference stations may be deployed in radius of 20 kms to provide high accuracy geo-location within an error of 1-2 cm. Reference stations use advance triangulation schemes that combine multiple sources (Glonass, GPS, etc.) to provide high accuracy at a significantly higher cost because the deployment of multiple specialized reference stations.

Accordingly, in some embodiments, instead of using 5G Timing Advance calculations or using the RSSI signal to estimate the distance, pathloss calculations in dB may be used from the 5G remote radio unit (RRU) to the UE antenna. The 5G pathloss readings in dB is one of the L1 indicators in 5G. In particular, the 3D distance of the UE from the 5G RRU may be extracted in meters by using the 3GPP TS 38.901 Pathloss formula. This result may provide an accuracy of ±about 2 dB.

Figure 3:
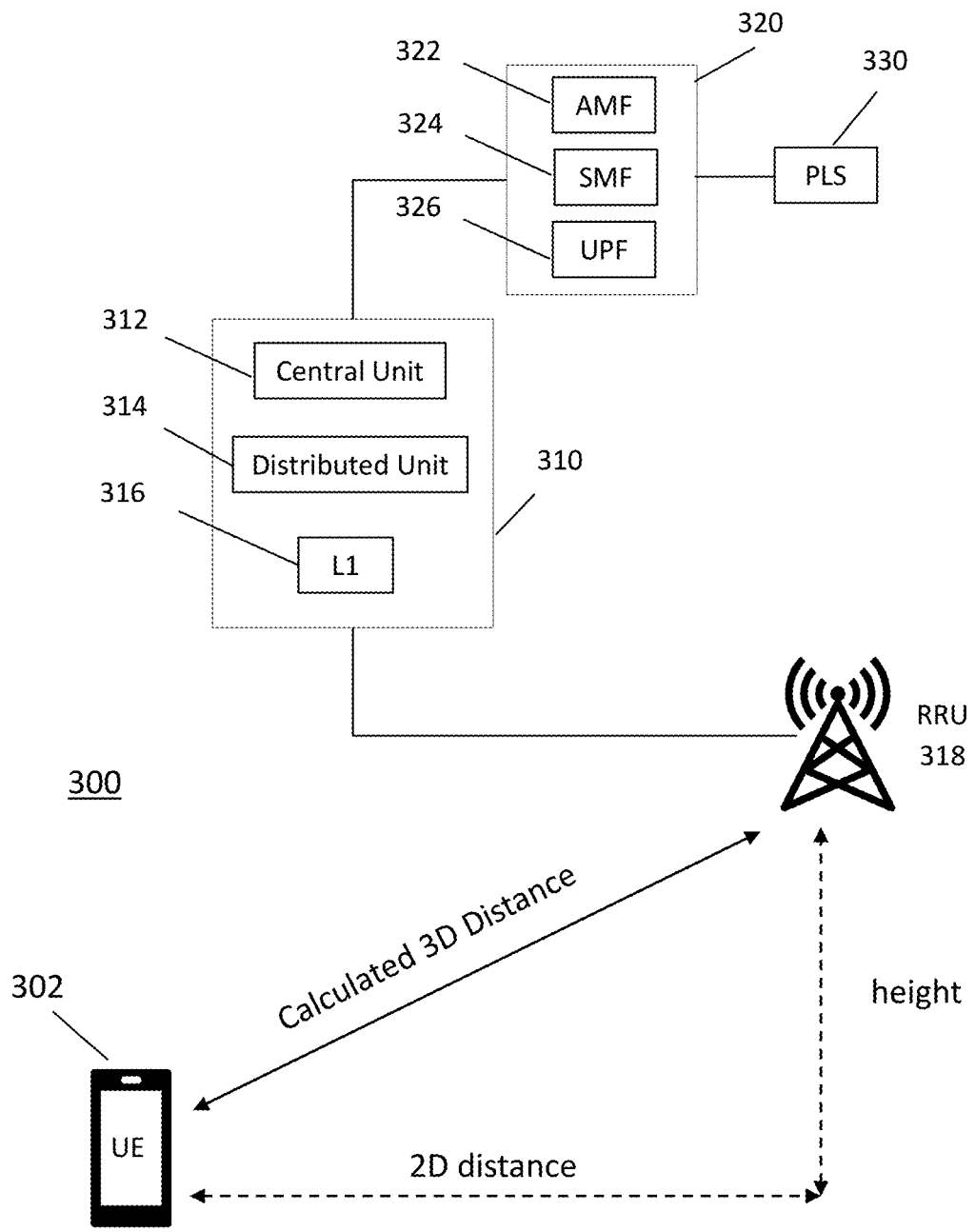
FIG. 3 illustrates a private 5G network in accordance with some embodiments.

FIG. 3 illustrates a private 5G network in accordance with some embodiments. In particular, in the private 5G network 300, the distance between the UE 302 and the RRU 318 of a site 310 may be calculated by the UE 302. The RRU 318 is coupled with the central portion of the site 310 either wirelessly or through a wired connection. The site 310 may perform functions in the private 5G network 300 similar to that of the gNB in a 5G public network indicated above.

As shown, the site 310 may implement protocol entities in the 3GPP protocol stack, in which the layers are considered to be ordered, from lowest to highest, in the order Physical (PHY) (L1 layer), Medium Access Control (MAC), Radio Link Control (RLC), Packet Data Convergence Control (PDCP), and Service Data Adaptation Protocol (SDAP) (for the control plane/user plane) (L2 layer), and Radio Resource Control (RRC) (L3 layer). The L1 layer may take care of link adaptation, power control, cell search (for initial synchronization and handover purposes) and other measurements. In particular, the L1 layer may provide functions that include: error detection on the transport channel and indication to higher layers; FEC encoding/decoding of the transport channel; Hybrid ARQ soft-combining; rate matching of the coded transport channel to physical channels; mapping of the coded transport channel onto physical channels; power weighting of physical channels; modulation and demodulation of physical channels; frequency and time synchronization; radio characteristics measurements and indication to higher layers; Multiple Input Multiple Output (MIMO) antenna processing; and RF processing. The L2 layer may provide functions that include: beam management; random access procedure; mapping between logical channels and transport channels; concatenation of multiple MAC SDUs belonging to one logical channel into a transport block (TB); multiplexing/demultiplexing of 5G-MAC SDUs belonging to one or different logical channels into/from TBs delivered to/from the physical layer on transport channels; scheduling information reporting; error correction through HARQ; priority handling between logical channels of one UE; and between UEs by dynamic scheduling; transport format selection; and padding. The L3 layer may provide functions that include: broadcasting of system information to NAS and AS; establishment, maintenance and release of RRC connections; security including key management; establishment, configuration, maintenance and release of point-point radio bearers; mobility functions along with cell addition and cell release; UE measurement reporting, control of UE reporting, UE based mobility; and NAS direct message transfer to/from NAS from/to UE.

The protocol layers in the site 310 may be distributed in different units, including the Central Unit (CU) 312, at least one Distributed Unit (DU) 314, and an L1 316, as well as the RRU 318. The CU 312 may provide functionalities such as the control the transfer of user data, and effect mobility control, radio access network sharing, positioning, and session management, except those functions allocated exclusively to the DU 314.

The higher protocol layers (PDCP and RRC for the control plane/PDCP and SDAP for the user plane) may be implemented in the CU 312, and the RLC and MAC layers may be implemented in the DU 314. The PHY layer may be split, with the higher PHY layer also implemented in the DU 314, while the lower PHY layer is implemented in the L1 316 and/or the RRU 318. The CU 312 may be connected with multiple DUs 314. The DU 314 essentially may manage scheduling of both uplink and downlink data with the UE 302 (among multiple UEs connected with the private 5G network 300). The L1 316 may manage, for example, MIMO, MCS, and time pattern for communication with the UE 302 (and the other UEs). Note that in some embodiments, the L1 316 may be part of the DU 314.

The interfaces include the E1 and front-haul (F) F1 interface. The E1 interface may be between a CU control plane (CU-CP) and CU user plane (CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the CU-CP and CU-UP using a non UE-associated signaling connection and UE-associated services that are related to a single UE and are associated with a UE-associated signaling connection that is maintained for the UE.

The F1 interface may be disposed between the CU 312 and the DU 314. The CU 312 may control the operation of the DU 314 over the F1 interface. As the signaling in the site 310 may be split into control plane and user plane signaling, the F1 interface may be split into the F1-C interface for control plane signaling between the DU 314 and the CU-CP, and the F1-U interface for user plane signaling between the DU 314 and the CU-UP, which support control plane and user plane separation.

The site 310 may be connected to a private 5G network CN 320 in the private 5G network 300. The private 5G network CN 320 may contain some or all of the elements of the CN in the 5G public network. As shown, the private 5G network CN 320 includes at least an AMF 322, an SMF 324, and a UPF 326, as described in more detail with relation to FIGS. 1A-1C. The private 5G network CN 320 may communicate with a private location server (PLS) 330 either wirelessly or through a wired connection using one or more of the protocols above.

The UE 302 and the PLS 330 may perform different functions in determining the UE location. One mechanism to determine the UE location may be determination of the pathloss between the RRU 318 and the UE 302 in the private 5G network.

Pathloss is in general indicative of the reduction in power density of a signal transmitted from a transmitter to a receiver. The pathloss may occur due to diffraction or absorption caused by objects in the path of the signal; the pathloss may further include multipath effects. Pathloss is generally logarithmic in nature. Thus, the original transmission power may be known by the receiver; either a predetermined power may be used or the transmission power may be indicated in the signal.

The pathloss may be dependent on the 3D distance between the transmitter of the signal (e.g., the RRU 318) and the receiver of the signal (e.g., the UE 302). As shown in FIG. 3, the 3D distance may include the 2D distance between the UE 302 and the RRU 318 as well as the height difference between the antenna of the UE 302 and the antenna of the RRU 318.

The pathloss may be measured using any measurement signals, such as Demodulation Reference Signals (DMRS) or Channel State Information Reference Signal (CSI-RS) or other measurement signals specific to the private 5G network 300. The pathloss may be measured and reported by the UE 302 to the private 5G network CN 320 through the RRU 318 using a pathloss indicator. The pathloss reporting may be used in the 5G L1 layer 316 to manage the power control of the UE transmission power algorithm (e.g., adjust the power headroom); the private 5G network CN 320 may then update the UE 302 with one or more pathloss values to adjust the transmission power accordingly.

The pathloss may be also used in the course of generating a heatmap, or other data structure of pathloss value distribution in space (e.g., two or three-dimensional space). In some embodiments, the pathloss may be calculated based on a known 3D distance between the transmitter and receiver based on the expected transmission and reception powers and include the pathloss due to all obstacles, barriers, and attenuation from various sources encountered by the signal (as well as multipath effects) in the private 5G network. In addition, the antenna gains and cable losses between elements in the private 5G network 300 may also be incorporated in the calculation to transmit an accurate report of the pathloss indicator.

The pathloss may be calculated for one or more frequency ranges of interest (i.e., transmitted by the RRU 318). Examples of such ranges include the 3.3-3.8 GHz range (i.e., using the Citizens Broadband Radio Service (CBRS) frequency range) or mm-wave transmissions (about 24 or 28 GHz). In addition, other frequency ranges may be used, such as those associated with public 5G networks in association with, for example, leasing such a spectrum from a public 5G network supplier (e.g., AT&T, Verizon).

Table 1 below may be used to calculate the pathloss. The pathloss formula may have limited accuracy (e.g., ±2 dB). As the accuracy, however, is smaller than the RF signal fluctuation, the calculated 3D distance retains the same accuracy as the pathloss formula. Table 1 includes both the line-of-sight (LOS) and non-LOS (NLOS) pathloss calculation formula.

TABLE 1

| | Pathloss [dB], $f_c$ is in GHz and d is in meters | Shadow fading std [dB] | Applicability range, antenna height default values |
|---|---|---|---|
| LOS | $PL_{UMa-LOS} = \begin{cases} PL_1 & 10 \text{ m} \leq d_{2D} \leq d'_{BP} \\ PL_2 & d'_{BP} \leq d_{2D} \leq 5 \text{ km} \end{cases}$ <br><br> $PL_1 = 28.0 + 22 \log_{10}(d_{3D}) + 20 \log_{10}(f_c)$ <br> $PL_2 = 28.0 + 40 \log_{10}(d_{3D}) +$ <br> $20 \log_{10}(f_c) - 9 \log_{10}((d_{BP})^2 +$ <br> $(h_{BS} - h_{UT})^2)$ | $\sigma_{SF} = 4$ | $1.5 \text{ m} \leq h_{UT} \leq$ 22.5 m |
| NLOS | $PL_{UMa-NLOS} =$ <br> $\max(PL_{UMa-LOS}, PL_{UMa-NLOS})$ <br> for $10 \text{ m} \leq d_{2D} \leq 5 \text{ km}$ <br> $PL_{UMa-NLOS} =$ <br> $13.54 + 39.08 \log_{10}(d_{3D}) +$ <br> $20 \log_{10}(f_c) - 0.6(h_{UT} - 1.5)$ <br> Optional <br> $PL = 32.4 + 20 \log_{10}(f_c) + 30 \log_{10}(d_{3D})$ | $\sigma_{SF} = 6$ <br><br><br><br><br><br><br> $\sigma_{SF} = 7.8$ | $1.5 \text{ m} \leq h_{UT} \leq$ 22.5 m |

The UE 302 may use the measured (also referred to herein as the "true") pathloss to calculate the 3D distance from the RRU 318. After calculation of the 3D distance between the UE 302 and the RRU 318 based on the pathloss, a UE heatmap of an area within the private 5G network 300 may be generated by the UE using multiple measured pathloss/3D distance pairs. In some embodiments, the UE heatmap may be generated by relating the pathloss (e.g., in dB) from the RRU 318 to the distance (e.g., in meters) from the RRU 318.

In addition, the private 5G network 300 may generate a pathloss heatmap using a 5G NR propagation model. The pathloss heatmap may consider the overall layout of the indoor location in which the private 5G network 300 is used; the location (e.g., warehouse) may include walls, barriers, and furniture and other objects, among others, as well as the materials from which these are formed to generate the heatmap. However, for most applications, the pathloss heatmap generated may not have sufficient accuracy for the confined movement and interactions used in various indoor locations and robot movements; accordingly, as explained above, the pathloss heatmap may be further tuned to achieve an accuracy of 1 meter or less (i.e., square pixels of area about 1 m² or less). Thus, the pathloss heatmap may be tuned using real data from deployment scenarios for multiple UEs for enhanced accuracy, which may be useful in artificial intelligence (AI) applications (AI applications of automated UEs in the private 5G network 300). Note that the term "pixel" as used herein defines a contiguous area that provides the desired accuracy. Moreover, the term "about" is within a predefined margin of error, which may be up to 10%. Thus, for example, a square pixel of area about 1 m² is within the predefined margin of error of one square meter. The pathloss heatmap may use Cartesian coordinates, Polar coordinates, or any other coordinate system (e.g., architectural/building coordinates/blueprints, terrestrial) desired.

In some embodiments, a pathloss heatmap pixel (and thus heatmap) may include a combination of (calculated distance, value on which the calculated distance is based); note that although pathloss is described herein, any other value from which the distance can be derived may be used. Thus, in some embodiments, each pathloss heatmap pixel may only include a pathloss heatmap combination of (3D measured distance of pixel from the 5G RRU location, predicted pathloss). In other embodiments, additional information may be provided in different layers of the pathloss heatmap. Such information may include, for example, the environmental and physical structural parameters indicated herein. In various embodiments, each set of data may be added as an extension or an overlay to a base set of heatmap data, multiple sets of data may be combined to form a single extension/overlay (thus each extension/overlay may contain one or more sets of data), or some or all of the sets of data may be incorporated to the base heatmap data to form the heatmap. In one example, as discussed in more detail below, each set of environmental data (e.g., temperature, humidity) may be a separate extension/overlay, some or all of such data may be combined into a single extension/overlay, or may be an integral part of the heatmap. For convenience, one base set of heatmap data (distance, pathloss) will be referred to herein as the heatmap data.

Multiple sample points may be taken at predetermined distance intervals (e.g., about 1-10 meters) by one or more UEs to generate real data of the heatmap. The distance intervals may not be the same in different locations within the private 5G network 300; that is, the distance intervals may be affected by permanent or temporary (i.e., objects) features of the structure in which the private 5G network 300 is located (affecting the change in pathloss with distance from the RRU), and thus the distance intervals may be different in different locations within the structure. One or more sets of this data (which may be taken at different times/under different conditions) may be used to train an AI propagation model of predicted pathloss vs. location (which may include both LOS and NLOS pathloss). The number of sets of data (and the AI model) may be dependent, for example, on the change in physical conditions within the structure (e.g., number and type of objects present and materials from which the objects are constructed, environmental conditions). Note that the distance intervals may be selected to achieve a predetermined accuracy in the AI model.

After creation of the heatmap, to determine the location of the UE at any point in time based on the heatmap, the measured combination of (calculated distance, true pathloss) of the UE may be compared to all the pixels in the heatmap to find a match. In addition, in some cases, once the heatmap has been created, the heatmap may be transmitted to a particular UE and stored therein.

Figure 4A:
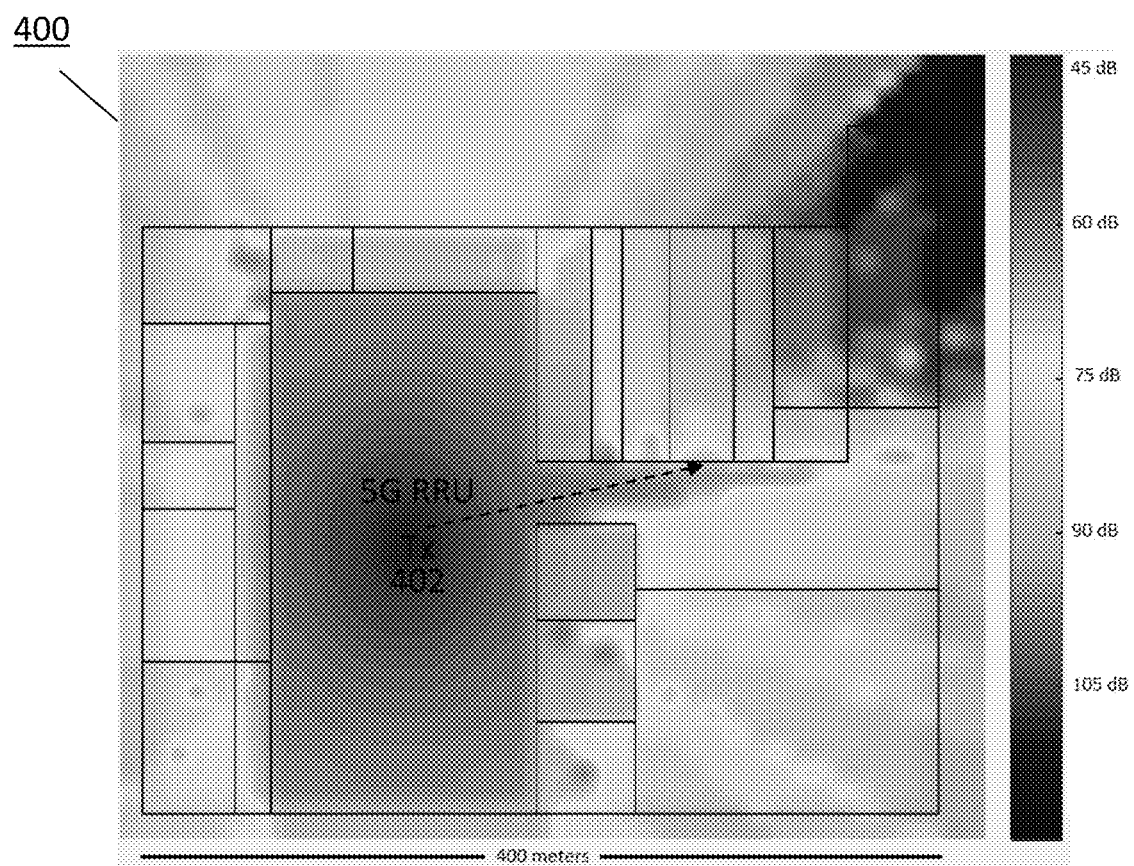
FIG. 4A illustrates a 5G pathloss heatmap with single pixel match in accordance with some embodiments.

The heatmap may have one pixel or multiple pixels that meet the combination of (calculated distance, true pathloss) criteria. FIG. 4A illustrates a 5G pathloss heatmap with single pixel match in accordance with some embodiments. As shown, the UE reports a pathloss 61 dB and the calculated distance from the RRU 402 based on the formulas in Table 1 is 153 meters. This combination is then matched against the same values in the heatmap 400. As shown, only 1 pixel (location) in the heatmap 400 satisfies the combination.

As above, however, there may be more than one location in the heatmap that meet the same criteria of distance and predicted pathloss—accordingly, additional information may be used to determine the correct pixel. In this case, to narrow the number of potential locations to determine the actual location and thus improve the location accuracy, one or more Reference Points (RP) may be used. The RP data may thus be another extension/overlay to add to the heatmap.

The RP may be distributed at locations in the private 5G coverage to point to help narrow and filter to the correct pixel if more than one pixel has the same combination of the distance and pathloss criteria. The RP locations may be pre-defined within the area of private 5G coverage or may be dependent on the heatmap. The private 5G network 300 may use AI to determine whether (and if so, where) to position the RP. The number of RP used may be dependent on the size and layout of the private 5G network. In some embodiments, the number of RP may be determined to be the minimum RP for each pixel to be uniquely identified by the combination of the heatmap, pathloss, and RP information. This, as explained in more detail below, may involve training an AI model based on the above input until each combination of the heatmap, pathloss, and RP information is associated with the single, unique pixel. The AI model and various calculations may be performed in the PLS.

The RP may transmit any reference signal that is able to be detected by the UE, and may be, for example a Wi-Fi transmitter, a dummy transmitting node (avoiding excessive Wi-Fi infrastructure costs), or BLE beacon. The UE may, for example, use a Wi-Fi modem to determine the Received Signal Strength Indicator (RSSI) and/or other L1 indicators of a preconfigured 2.4 GHz channel. Although RSSI of the WiFi signal is referred to, other signal characteristics (e.g., Reference Signal Receive Power (RSRP) or Reference Signal Received Quality (RSRQ)) may be used instead of the RSSI. In addition, if multiple WiFi transmissions are received from the same RP prior to transmission to the RRU, the RSSI may be averaged or only the RSSI closest to that in time of reception of the signal from the RRU may be used, with the others discarded for accuracy—with the selection dependent on whether or how fast the UE is moving. In some embodiments, the RSSI may be determined from each RP that the UE is able to receive. In some embodiments, the UE may discard an RSSI that is below a minimum RSSI (e.g., 2 dB above noise level), or may use one or more of the strongest RSSI only (discarding the remaining RSSI). Each RP may be assigned a different channel to minimize interference. In some embodiments, the channel does not carry any actual data, instead a dummy transmission is merely used as a reference signal to measure the RSSI. Each RP may have the same transmission power, which may be selected to be low enough to avoid or minimize reflections from objects in the vicinity of the RP.

Figure 4B:
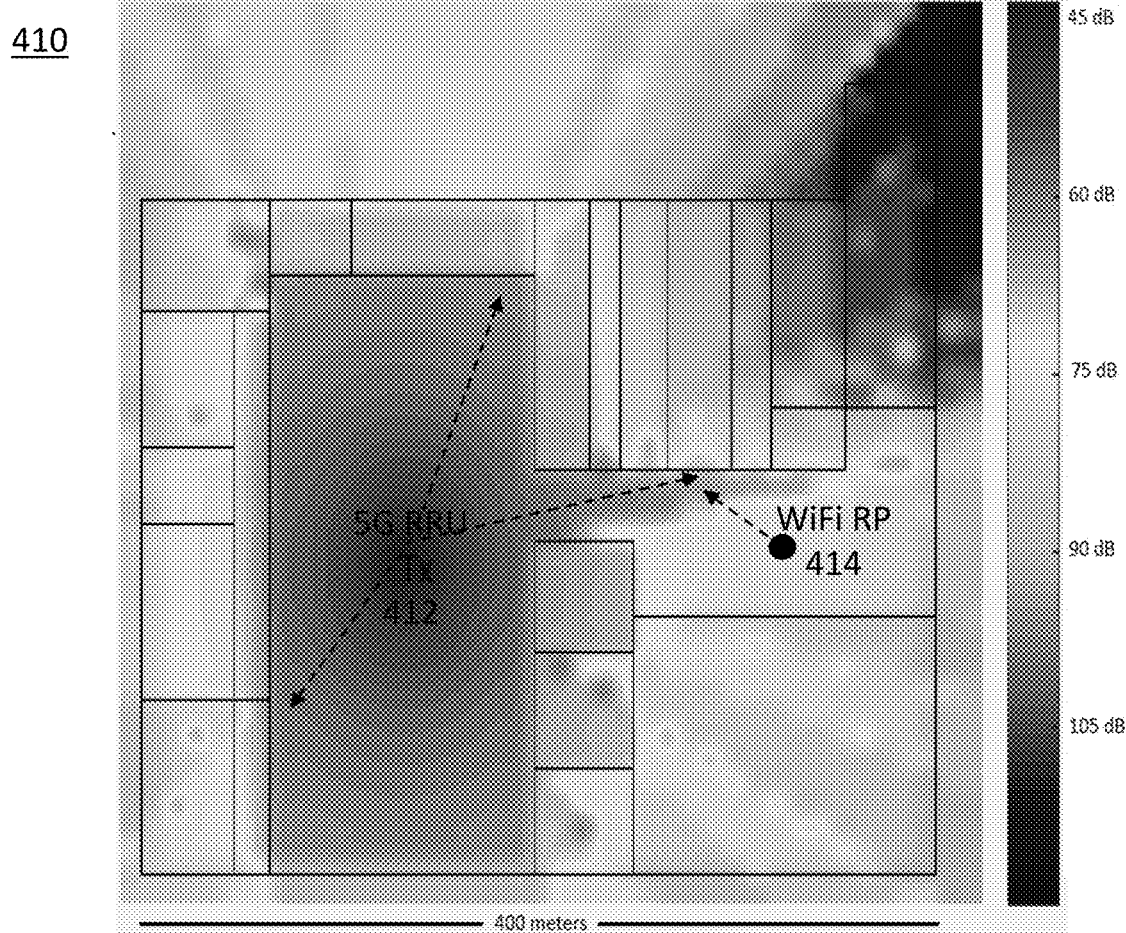
FIG. 4B illustrates a 5G pathloss heatmap with multi-pixel match in accordance with some embodiments.

In some embodiments, the UE may be provided with a mapping between the location of each RP and corresponding channel used by the RP to enable the UE to determine the UE location based on the RSSI. In other embodiments, the UE may send the information (RSSI and channel) to the RRU for the PLS to determine the UE location. A single RP may be used, or multiple RP may be used with Wi-Fi triangularity (even if relatively low accuracy) may be combined with the heatmap to determine the correct UE location. FIG. 4B illustrates a 5G pathloss heatmap with multi-pixel match in accordance with some embodiments. As shown in the heatmap 410, three locations satisfy the combination of 3D distance (128 meters) and pathloss (62 dB) from the 5G RRU 412. Although the UE location is unable to be determined based only on this information, only one RSSI from the WiFi RP 414 may be used to supplement the heatmap information and allow the correct UE location to be determined.

One issue may be to enable the UE to continuously detect and report the L1 indicators from the 5G RRU 412 via the 5G modem using 5G NR technology while essentially simultaneously use the Wi-Fi modem to detect signals from the WiFi RP 414. That is, entirely different hardware elements, difference technologies, and different frequencies are to be used substantially simultaneously.

To resolve this issue, in some embodiments the 5G modem and the Wi-Fi modem may be used to receive all data from the L1 layer, while allowing the reporting to the 5G system to be performed only by the application layer. Accordingly, the process may be broken into two distinct operations: a read operation and a report operation. In the read operation, the UE may read the 5G RRU indicators (pathloss, RSSI, RSRP, RSRQ, SNR, etc. . . . ) (at the CBRS or leased frequency) and the RP L1 RSSI indicator (at the WiFi frequency). Each of the indicators may represent a different extension/overlay that may be added to the heatmap (as may the 3D distance, 2D distance, and height). The read operation may occur sequentially at the same rate, so that the data from both sources is closely correlated. Both sets of data may be saved in a file in the UE memory.

In the second operation, the file may be periodically sent to the 5G network. The periodicity may be determined based on a desired movement accuracy (e.g., one update per second). In some embodiments, if the transmission periodicity is smaller than the read periodicity of the data, the data in the file may be overwritten so that only the latest set of data is sent. In other embodiments, all data from the last report may be stored and recorded to allow accurate tracking of the UE movement and directionality in addition to UE position. In particular, as shown in FIG. 3, the data may be transmitted through the 5G RRU to the 5G private CN, to the PLS. The PLS may be connected directly to the UPF node, which may function as a gateway for the data traffic associated with the UE and direct the report to the PLS server using a predetermined protocol (e.g., UDP). All of the information may be provided between the UE and the PLS within a short amount of time (e.g., about 30 ms) to allow the UE (robot) to make movement decisions while traveling at speed.

Figure 5:
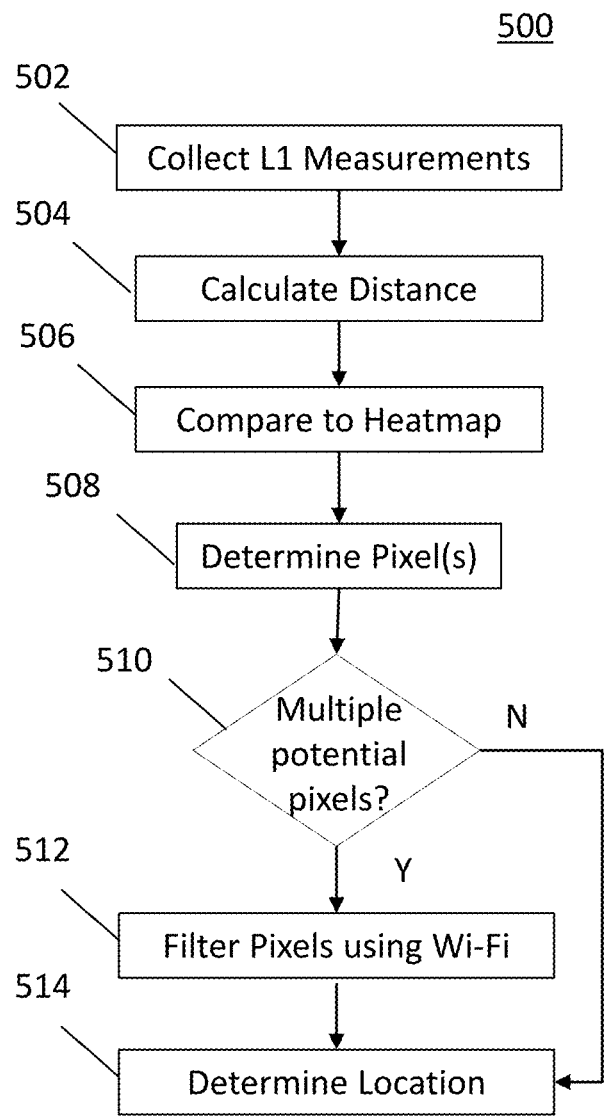
FIG. 5 illustrates a flowchart of determining UE location in accordance with some embodiments.

The PLS may receive data (files) from one or more UEs attached to the private 5G network. The data from each UE may be transmitted to the PLS from the 5G private CN at the same time or may be transmitted at different times that are separated by a minimum period, such as that used to calculate a UE location. FIG. 5 illustrates a flowchart of determining UE location in accordance with some embodiments. The method 500 of determining the UE location may include multiple operations. Additional operations may be present, but are not shown for convenience.

After the L1 measurements are taken by the UE, the L1 measurements are sent by the UE to the RRU and collected by the PLS at operation 502. The PLS may then perform multiple operations to determine the UE location based on the data. The PLS may first sort all data (5G L1 indicators and Wi-Fi indicators) per UE and subsequently at operation

504 calculate the 5G 3D distance from the pathloss (5G L1 indicators) for every UE based on the model in Table 1. The PLS may compare the combination to the combinations in the heatmap stored in the PLS at operation 506 to determine at operation 508 all pixels in the heatmap that match the combination (distance, pathloss). As above, other 5G indicators may be used in addition to, or instead of, pathloss. The 5G indicators may be provided as one or more extensions or overlays. Other extensions/overlays may include other sensor inputs of the UE, such as ambient temperature and humidity in the UE vicinity when the UE distance was calculated from the RRU, lidar information, acoustic information, among others, that may provide information about nearby objects and walls.

The PLS may determine at operation 510 whether multiple potential matches exist. If the PLS determines at operation 510 that there is more than a single pixel that matches the combination, the PLS may calculate the Wi-Fi triangularity based on the WiFi RSSI (or, as above RSRP) of the Wi-Fi indicators to filter the pixels (eliminate pixels that do not correspond to the appropriate value) at operation 512. Whether or not multiple pixels match the combination, at operation 514, the PLS may determine the correct pixel (UE location). The PLS may repeat this calculation to track movement of the UE to allow the 5G private CN to send instructions to the UE to adjust movement to avoid obstacles and/or change directions (or terminate movement) if desired.

In addition to determination of the UE location, the heatmaps from multiple UEs may be consolidated/federated. The 5G RRU, using the accumulation of multiple heatmaps that are provided by all the UEs in a given range, may generate a single federated heatmap that may be propagated back to the UE. The RRU may use a processor, such as an application-specific integrated circuit (ASIC) to generate the federated model. The range may include the entire coverage area of the private 5G network, such as a factory, or may be more limited to allow the federated heatmap of the entire private 5G network to be stitched together from the individual smaller UE heatmaps provided by the individual UEs.

In some embodiments, once each UE is able to establish the potential location, the UE may use the federated heatmap to compare with its own constructed heatmap and make changes to the heatmap (and movement decisions) based on the differences therein. The adjustment in heatmap may be based on environmental changes or other contextual data of the heatmap. For example, in circumstances where the ambient conditions may change and may affect the heatmap generation, a sufficient number of UEs may work together to quickly create a federated heatmap. Furthermore, in extreme environmental conditions, a UE may detect the extreme conditions and decide to use the provided heatmap to get closer to the RRU in order to establish a more accurate location based on a stronger dB signal from the RRU. The federated model generation may also include ambient environmental and time information to cluster factors that may be used to establish federation of multiple modes based on those contextual conditions. In some embodiments, the PLS may instead, or in addition, be responsible for the generation of the federated heatmap from the individual UE heatmaps.

Figure 6:
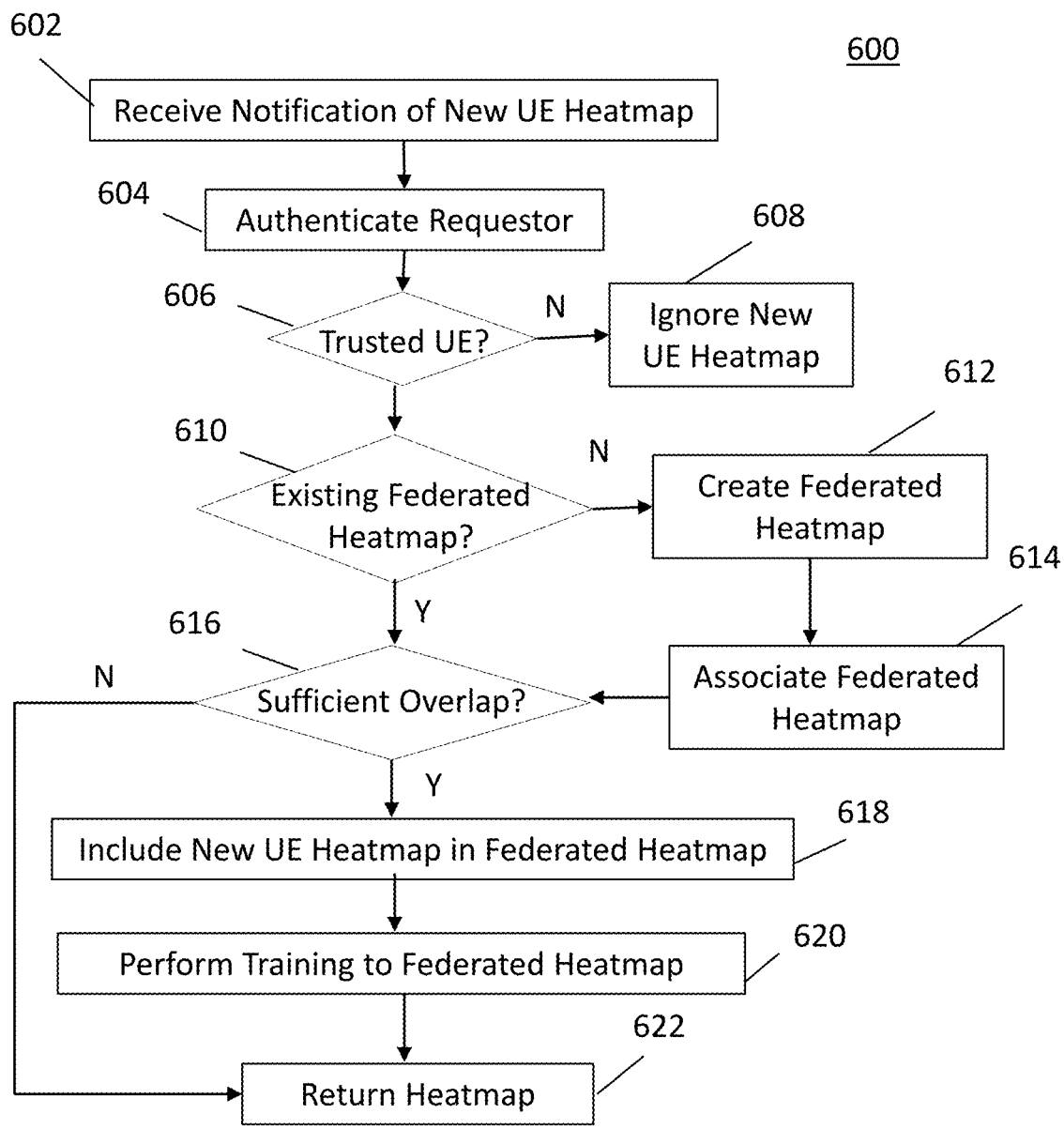
FIG. 6 illustrates a flowchart of establishing a heatmap in accordance with some embodiments.

FIG. 6 illustrates a flowchart of establishing a heatmap in accordance with some embodiments. Additional operations may be present, but are not shown for convenience. The order of at least some of the operations in the method 600 shown in FIG. 6 may be different. In some embodiments, the PLS may perform some of the operations instead of, or in addition to, the RRU. In the method 600 of FIG. 6, the RRU may have a connection into a new building block for which the RRU is responsible to train the AI model using the 5G information (5G L1 indicators e.g., taken at the CBRS or leased frequency, and possibly WiFi L1 indicators taken at the WiFi frequency) and generate a federated heatmap for the private 5G network using the heatmaps generated by the different UEs. Accordingly, as shown in FIG. 6, the RRU may receive a notification of a new UE heatmap at operation 602. The new UE heatmap may be from a previously-authenticated UE or from a new UE that has not yet been authenticated by the 5G private CN. Authentication may be based on registration of the UE with the private 5G network and authentication via either 5G authentication mechanisms or using a stored database of pre-allocated UEs.

Accordingly, at operation 604, the RRU may authenticate the requestor (UE) of the heatmap and determine at operation 606 whether the UE providing the new UE heatmap is from a trusted source (one that has provided at least one accurate UE heatmap previously). Each UE may send to the RRU a heatmap generated by the UE based on the formula provided in Table 1. In some embodiments, the RRU may correlate the new UE heatmap provided by the UE with other UE heatmaps provided from other UEs that are closer to the UE than the RRU. This comparison may be used to determine whether the new UE heatmap is significantly different from one or more of the other UE heatmaps (e.g., having more than X % of difference, where X may be set as desired, e.g., 2%, 5%, 10%).

In response to a determination that the UE is an untrusted device, the heatmap may be ignored at operation 608. Moreover, if the UE is a trusted device but the new UE heatmap is determined to be significantly different from the one or more other UE heatmaps, the RRU may not only discard the new UE heatmap, but in addition update the reputation for the UE to that of an untrusted device. In some embodiments, the update may occur only after a predetermined number of heatmaps that are determined to be significantly different (with the count being decremented or reset once a heatmap of the UE is not found to be significantly different). Similarly, in some embodiments, the UE reputation may be updated to trusted once a heatmap of the UE is not found to be significantly different (i.e., the heatmap is not automatically rejected but first compared to other heatmaps). In response to a determination that the UE is a trusted device, the RRU may determine at operation 610 whether a federated heatmap exists under the contextual data associated with the heatmap. The federated heatmap may include individual UE heatmaps from multiple UEs covering similar areas of the private 5G network. The contextual data may be determined by the UE (e.g., using the UE sensors) and transmitted to the RRU. Alternatively, or in addition, the RRU may independently determine the contextual data or receive the contextual data from another network source.

The contextual data may be of different types. The contextual data may include positional data, time data, and environmental data, among others. The positional data may include the current estimated position of the UE determined by the UE using the method described above. The time may be used to determine a time series of generation of the new UE heatmap. That is, the UE may generate multiple heatmap (distance, pathloss) pairs of the new UE heatmap prior to transmission of the new UE heatmap to the RRU. The new UE heatmap covers only a section of the entire heatmap of the private 5G network environment. The time information associated with each pair (or section) may provide series timing of the new UE heatmap generated by the UE (i.e., the time interval when each of the partitions of the heatmap was taken). The environmental conditions may include ambient temperature and humidity in the UE vicinity when the UE distance was calculated from the RRU. Other contextual data provided by the UE to the RRU with the heatmap may include other sensor information, such as lidar information, which may be used to extrapolate how close or far the UE is from objects that may interfere with the signal strength of the reference signal of the RRU measured by the UE, as well as acoustic information, which may provide additional information about the type of object.

Turning back to FIG. 6, in response to a determination at operation 610 that a federated heatmap does not exist under the contextual data environmental conditions associated with the new UE heatmap, the RRC may at operation 612 create a new federated heatmap (with the contextual data) that includes the new UE heatmap. The RRU may subsequently associate at operation 614 the new federated heatmap with the contextual data (either supplied by the UE or determined by the RRU).

Once the RRU has determined that the federated heatmap for the section of the private 5G network has been generated and associated with contextual data (whether or not the federated heatmap previously existed prior to reception of the new UE heatmap), at operation 616 the RRU may determine whether the new UE heatmap has sufficient overlapping area with an already existing federated heatmap. As above, the overlap may be a predetermined percentage of the entire area, e.g., 50%, 60%, 70%, 80%, 90%. In response to a determination that the new UE heatmap has sufficient overlapping area, the RRU may at operation 618 add the data set of the new UE heatmap to the existing federated heatmap data set for training by an AI model. At operation 620, the AI may perform training (in a training mode) on the federated heatmap data set that includes the data set of the new UE heatmap.

Whether or not the new UE heatmap has sufficient overlapping area with an already existing federated heatmap, however, at operation 622 the (new or existing) federated heatmap that corresponds to the given contextual data may be returned to the UE. The UE may then update the federated heatmap and may use the federated heatmap received to correct/adjust or validate the new UE heatmap.

Figure 7:
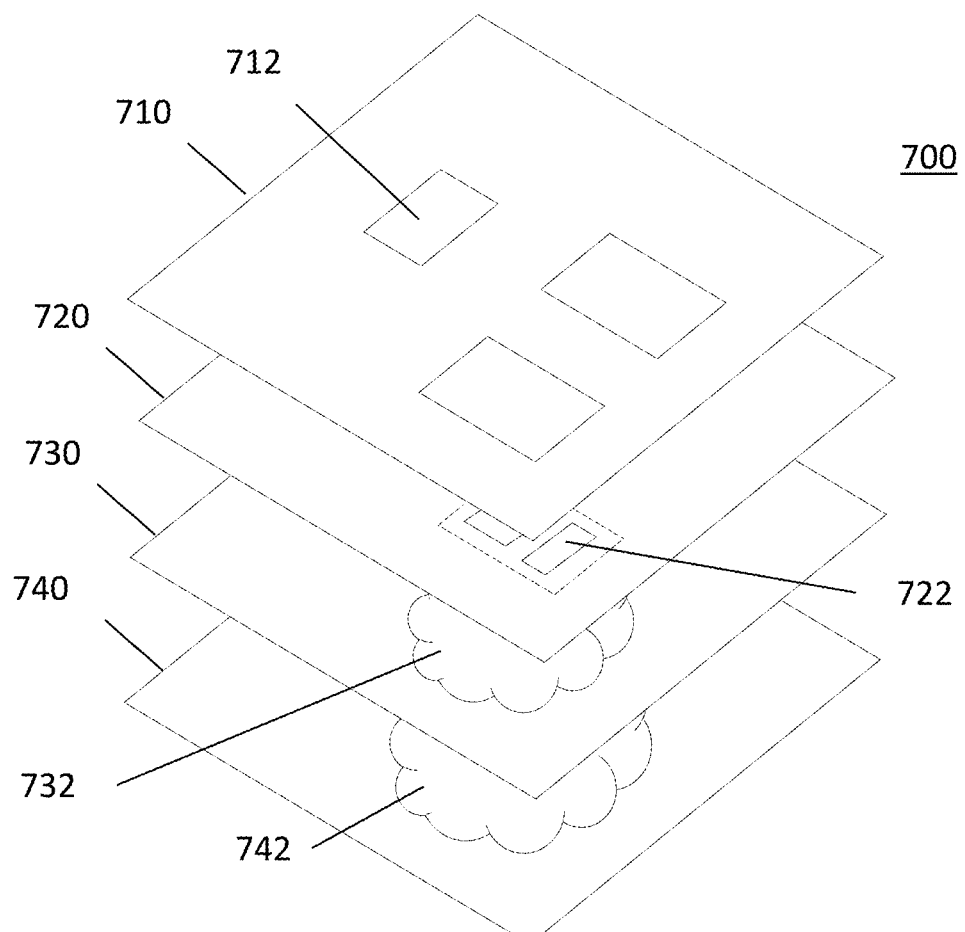
FIG. 7 illustrates a layered structure of a heatmap in accordance with some embodiments.

FIG. 7 illustrates a layered structure of a heatmap in accordance with some embodiments. As shown and described above, the heatmap 700 contains multiple layers 710, 720, 730, 740 (also referred to as overlays or extensions above). Each layer 710, 720, 730, 740 may contain one or more sets of data 712, 722, 732, 742, as above. Examples of the layers 710, 720, 730, 740 include a geographical region layer 710, a first localized geographical region layer 720, a first predicted value layer 730, a first associated data value layer 740, etc. . . . . One or more of the layers 710, 720, 730, 740 described may not be present and/or additional layers of the same or different types may be provided.

The geographical region layer 710 may include one or more structures (e.g., buildings) 712 covered by the private 5G network. The first localized geographical region layer 720 may include one or more internal structures (e.g., walls) 722 within one of the structures 712. Another layer (not shown) may include one or more objects or objects of a particular type/material (e.g., shelves) within one of the structures 712. The first predicted value layer 730 may include information such as predicted pathloss 732 within one of the structures 712. The first associated data value layer 740 may include information such as environmental data, specifically temperature 742 within one of the structures 712. These layers 710, 720, 730, 740 may be duplicated for each structure 712, and each structure 712 may have multiple predicted, structural, and/or associated data as indicated above (e.g., WiFi signal strength). Such data may be segmented into different levels within a particular structure if, for example, the structure has multiple floors. The layers 710, 720, 730, 740 may be provided, as above, in any coordinate system desired, including landscape, geographical, architectural-related (e.g., blueprint) coordinates. At least some of the layers 710, 720, 730, 740 may be structural architectural-related layers that include architectural-related features.

Note that the heatmap 700 may essentially be considered an output file, examples of which may include an image file or data tables, among others. Accordingly, the input file can contain any data used to generate the heatmap 700; the input and output files may be provided in any desired format (including image data such as a pdf or dwg file). Note also that term "heatmap" is merely being used to indicate the data used to provide the output discussed herein, and thus may be called by a number of other terms such as a topology or reference topology.

The illustrated layered heat map may be transmitted to a UE. The UE may receive the heatmap, or any single or multiple layers, from one or more different infrastructure components. For example, the RRU described above, may provide the heat map and a cloud service may provide a listing of current hazards in the map. Other infrastructure components, such as a fog edge node, edge node, peer UE, may also provide layers or the heatmap itself. In an example, the UE is robot, such as an autonomous vehicle, mobile manufacturing robot, drone, or the like.

Thus, accurate location may be provided in an indoor private 5G network, which is run by a private enterprise and is not for general public use, and used in a limited area (e.g., a warehouse). An AI model in a PLS that contains predicted pathloss (with LOS and NLOS contributions for the CBRS or leased frequency) may be used to generate a predicted heatmap and determine a UE location based on measured RRU information from a UE based thereon (determination of the pathloss may provide multiple data points to find the exact location of the UE: the true pathloss and the calculated distance). In some cases, further information, including signal strength from one or more RP may be used to determine the UE location. The PLS may store both the heatmap and RP signal strength map for use as above. The use of the heatmap (and possibly RP) may provide a relatively fast (e.g., <about 10 ms) and accurate (e.g., 1 m) of a private 5G network in an indoor setting in which a public 5G network may be limited or unavailable. This may permit UEs, such as robots, to determine their locations and make decisions on movements and routing based thereon (as well as the location and movement of other objects/UEs/robots).

Thus, instead of using 5G Timing Advance calculations, which have an accuracy of hundreds of meters, or merely using the RSSI signal to estimate distance, pathloss calculations in dB from an 5G RRU to the UE antenna may be used. The 5G pathloss readings is one of the L1 indicators in 5G, and using a predetermined pathloss formula (from 3GPP TR 38.901) taken at the CBRS or leased frequency, the 3D distance may be extracted in meters of the UE from the 5G RRU with a high accuracy of ±2 dB. This provides two points of data to find an exact location of the UE in the heatmap: true pathloss and calculated distance. The heatmap for pathloss in dB uses propagation models with the RRU parameters and RF environment for the indoor location. The heatmap predicts RF indicators including pathloss, and the prediction accuracy may be improved using live data to compare and fine tune the model. The heatmap has pixels of 1 square meter per pixel, with each pixel being tagged by (Measured Distance from the RRU location, Predicted Pathloss to the RRU location) from the propagation model. All pixels in the heatmap that match the UE location criteria (Calculated Distance, True Pathloss) are determined and: if the match is just one pixel, then this pixel is the exact location of the UE; whereas if more than one pixel matches the criteria, a second source of data is used to filter which pixel is the correct location. The second source of data is a reference point (dummy Wi-Fi transmitter) pre-distributed in the 5G private coverage, use of Wi-Fi triangularity may be used to filter the correct pixel as the new location—regardless of the WiFI accuracy.

To summarize the process of identifying the exact location of a UE in a private 5G network: Collect 5G L1 measurements, especially pathloss in dB (True Pathloss); Calculate the 3D distance using the pathloss method using 3GPP TR 38.901 (Calculated Distance); Using a tuned propagation model generate a heatmap pixelized to 1 sq meter point (Predicted Pathloss, Measured Distance); Short list all pixels that meet the combinations of (True pathloss and calculated distance); and Filter the correct pixel using Wi-Fi Triangulation.

In addition, the heatmaps may be propagated back from the UE to the 5G RRU. The RRU, using the accumulation of multiple heatmaps that may be provided by all the UE in a given range (e.g., factory) may generate a single federated heatmap that may be propagated back to the UE (federated model uses NN). Once the UE establish their potential location, the UE may use the federated heatmap to compare with their own constructed heatmap. Thus, in circumstances where the ambient conditions may change and may affect the heatmap generation, the hive of devices may work together to create those heatmaps quickly. Furthermore, in extreme conditions, a UE may decide to use the provided heatmap to get closer to the RRU to establish a more accurate location based on stronger dB. This federated model generation also includes ambient and time information to cluster factors that may require federation of multiple modes based on those contextual conditions. The heatmaps generated by the UE (used to train the federated heatmap) are divided in small quadrants (e.g., N×N pixels). Each of them contains metadata that may allow to better identify specific circumstances of how that part of the heatmap was generated. Examples are temperature, lidar information to identify proximity of elements, acoustic information, etc.

In other embodiments, a similar function may be applied to public networks, as well as private networks.

EXAMPLES

Example 1 is an apparatus of a private next generation (NG) network, the apparatus comprising: processing circuitry configured to: generate a heatmap of an indoor structure, the heatmap containing locations within the indoor structure and a pathloss associated with each location, each location being a three dimensional (3D) distance from a remote radio unit (RRU) of the private NG network, the pathloss calculated based on the 3D distance; receive, from a user equipment (UE) via the RRU, a measured pathloss and corresponding distance of the UE from the RRU, the corresponding distance based on the measured pathloss and determined by the UE; determine a position of the UE based on a comparison between the measured pathloss and corresponding distance and the pathloss and location in the heatmap; and transmit the position to the UE via the RRU; and memory configured to store the heatmap.

In Example 2, the subject matter of Example 1 further includes that in response to a single pixel of the heatmap matching the measured pathloss and corresponding distance, the processing circuitry is configured to determine the location as the single pixel.

In Example 3, the subject matter of Examples 1-2 further includes that in response to multiple pixels of the heatmap matching the measured pathloss and corresponding distance, the processing circuitry is configured to determine the location based on additional information from the UE.

In Example 4, the subject matter of Example 3 further includes that the additional information is a value of a dummy WiFi signal transmitted by at least one reference point (RP) that is positioned at a different location than the RRU.

In Example 5, the subject matter of Example 4 further includes that the value is a Received Signal Strength Indicator (RSSI) of the dummy WiFi signal.

In Example 6, the subject matter of Examples 4-5 further includes that the additional information includes the value of the dummy WiFi signal transmitted by multiple RP positioned at a different locations than the RRU.

In Example 7, the subject matter of Example 6 further includes that the dummy WiFi signal transmitted by the multiple RP have a same transmit power.

In Example 8, the subject matter of Examples 3-7 further includes an indicator measured by the UE as the additional information.

In Example 9, the subject matter of Examples 1-8 further includes an indicator measured by each of the plurality of UEs from at least one RP as additional positioning information.

In Example 10, the subject matter of Example 9 further includes an indicator from the UE.

In Example 11, the subject matter of Examples 1-10 further includes that the heatmap is generated based on a layout of the indoor structure and objects within the indoor structure.

In Example 12, the subject matter of Examples 1-11 further includes that the pathloss in the heatmap depends on both a value of a signal from the RRU and type of propagation of the signal from the RRU, the type of propagation including at least one of Line-Of-Sight (LOS) or Non-Line-Of-Sight (NLOS).

In Example 13, the subject matter of Examples 1-12 further includes that the measured pathloss is based on a signal from the RRU that is transmitted in a Citizens Broadband Radio Service (CBRS) frequency range.

In Example 14, the subject matter of Examples 1-13 includes that an area each pixel in the heatmap is at most about 1 m².

In Example 15, the subject matter of Examples 1-14 includes that the heatmap comprises a base set of heatmap data and at least one extension or overlay that contains at least one additional set of data to augment the base set of data, the base set of heatmap data comprising a calculated distance and value on which the calculated distance is based to determine location within the heatmap.

In Example 16, the subject matter of Example 15 includes that at least one extension or overlay comprises at least one of environmental data that indicates environmental conditions in the private NG network under which the calculated distance was determined or structural data of a physical structure in which the private NG network is deployed.

Example 17 is an apparatus of a private next generation (NG) network, the apparatus comprising: processing circuitry configured to: receive a new heatmap of an indoor structure from a user equipment (UE), the new heatmap containing: data pairs of a location within the indoor structure and a pathloss associated with the location, the location being a three dimensional (3D) distance from a remote radio unit (RRU) of the private NG network, the pathloss calculated based on the 3D distance, and context data associated with the new heatmap; and in response to a determination that a federated heatmap has been created for similar contextual data, the federated heatmap including heatmaps received from multiple UEs, transmit the federated heatmap to the UE and provide the data pairs and contextual data of the new heatmap as a data set for an artificial intelligence (AI) module; and memory configured to store the federated heatmap.

In Example 18, the subject matter of Example 17 further includes that in response to a determination that a federated heatmap has not been created for similar contextual data, the processing circuitry is configured to create a new federated heatmap for the contextual data based on the new heatmap.

In Example 19, the subject matter of Examples 17-18 further includes that the processing circuitry is further configured to: validate the UE; and in response to validation of the UE as an untrusted UE, discard the new heatmap.

In Example 20, the subject matter of Examples 17-19 further includes that the processing circuitry is further configured to: validate the UE; in response to validation of the UE as a trusted UE, correlate the new heatmap with the heatmaps received from multiple UEs; and in response to determination during correlation of a significant difference between the new heatmap and the heatmaps received from multiple UEs, discard the new heatmap and update validity of the UE as an untrusted UE.

In Example 21, the subject matter of Examples 17-20 further includes that the contextual data contains sensor information of the UE, the sensor information selected from a set of sensor information that includes ambient temperature and humidity, Lidar information, acoustic information, and timing information that indicates when each portion of the new heatmap was generated.

Example 22 is at least one non-transitory computer-readable storage medium that stores instructions for execution by one or more processors of a user equipment (UE), the one or more processors to configure the UE to, when the instructions are executed: transmit a new heatmap of an indoor structure to a remote radio unit (RRU) of a private next generation (NG) network, the new heatmap containing data pairs of a location within the indoor structure and a pathloss associated with the location, the location being a three dimensional (3D) distance from a remote radio unit (RRU), the pathloss calculated based on the 3D distance, and context data associated with the new heatmap; and receive, from the RRU, a federated heatmap that includes, heatmaps having the context data and received at the RRU from multiple UEs.

In Example 23, the subject matter of Example 22 includes, layer of the WiFi modem received from at least one reference point (RP) at a different location from the RRU.

Example 24 is at least one machine-readable medium including instructions that, when executed by processing circuitry, cause the processing circuitry to perform operations to implement of any of Examples 1-23.

Example 25 is an apparatus comprising means to implement of any of Examples 1-23.

Example 26 is a system to implement of any of Examples 1-23.

Example 27 is a method to implement of any of Examples 1-23.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a private next generation (NG) network, the apparatus comprising:
processing circuitry configured to:
generate a heatmap of an indoor structure, the heatmap containing locations within the indoor structure and a pathloss associated with each location, each location being a three dimensional (3D) distance from a remote radio unit (RRU) of the private NG network, the pathloss calculated based on the 3D distance;
receive, from a user equipment (UE) via the RRU, a measured pathloss and corresponding distance of the UE from the RRU, the corresponding distance based on the measured pathloss and determined by the UE;
determine a position of the UE based on a comparison between the measured pathloss and corresponding distance and the pathloss and location in the heatmap; and
transmit the position to the UE via the RRU; and
memory configured to store the heatmap.

2. The apparatus of claim 1, wherein, in response to a single pixel of the heatmap matching the measured pathloss and corresponding distance, the processing circuitry is configured to determine the location as the single pixel.

3. The apparatus of claim 1, wherein, in response to multiple pixels of the heatmap matching the measured pathloss and corresponding distance, the processing circuitry is configured to determine the location based on additional information from the UE.

4. The apparatus of claim 3, wherein the additional information is a value of a dummy WiFi signal transmitted by at least one reference point (RP) that is positioned at a different location than the RRU.

5. The apparatus of claim 4, wherein the value is a Received Signal Strength Indicator (RSSI) of the dummy WiFi signal.

6. The apparatus of claim 4, wherein the additional information includes the value of the dummy WiFi signal transmitted by multiple RP positioned at a different locations than the RRU.

7. The apparatus of claim 6, wherein the dummy WiFi signal transmitted by the multiple RP have a same transmit power.

8. The apparatus of claim 3, wherein the processing circuitry is configured to receive a file that contains NG RRU indicators measured by the UE for the comparison and an RP L1 indicator measured by the UE as the additional information.

9. The apparatus of claim 1, wherein the processing circuitry is configured to receive a file that contains a NG RRU indicator measured by each of a plurality of UEs for a comparison of each NG RRU indicator with the heatmap and a reference point (RP) L1 indicator measured by each of the plurality of UEs from at least one RP as additional positioning information.

10. The apparatus of claim 9, wherein, for each of the plurality of UEs, the processing circuitry is configured to track movement of the UE based on the NG RRU indicator and the RP L1 indicator from the UE.

11. The apparatus of claim 1, wherein the heatmap is generated based on a layout of the indoor structure and objects within the indoor structure.

12. The apparatus of claim 1, wherein the pathloss in the heatmap depends on both a value of a signal from the RRU and type of propagation of the signal from the RRU, the type of propagation including at least one of Line-Of-Sight (LOS) or Non-Line-Of-Sight (NLOS).

13. The apparatus of claim 1, wherein the measured pathloss is based on a signal from the RRU that is transmitted in a Citizens Broadband Radio Service (CBRS) frequency range.

14. The apparatus of claim 1, wherein an area each pixel in the heatmap is at most about 1 $m^2$.

15. The apparatus of claim 1, wherein the heatmap comprises a base set of heatmap data and at least one extension or overlay that contains at least one additional set of data to augment the base set of heatmap data, the base set of heatmap data comprising a calculated distance and value on which the calculated distance is based to determine location within the heatmap.

16. The apparatus of claim 15, wherein at least one extension or overlay comprises at least one of environmental data that indicates environmental conditions in the private NG network under which the calculated distance was determined or structural data of a physical structure in which the private NG network is deployed.

17. An apparatus of a private next generation (NG) network, the apparatus comprising:
processing circuitry configured to:
receive a new heatmap of an indoor structure from a user equipment (UE), the new heatmap containing:
data pairs of a location within the indoor structure and a pathloss associated with the location, the location being a three dimensional (3D) distance from a remote radio unit (RRU) of the private NG network, the pathloss calculated based on the 3D distance, and
context data associated with the new heatmap; and
in response to a determination that a federated heatmap has been created for similar contextual data, the federated heatmap including heatmaps received from multiple UEs, transmit the federated heatmap to the UE and provide the data pairs and contextual data of the new heatmap as a data set for an artificial intelligence (AI) module; and
memory configured to store the federated heatmap.

18. The apparatus of claim 17, wherein in response to a determination that a federated heatmap has not been created for similar contextual data, the processing circuitry is configured to create a new federated heatmap for the contextual data based on the new heatmap.

19. The apparatus of claim 17, wherein the processing circuitry is further configured to:
validate the UE; and
in response to validation of the UE as an untrusted UE, discard the new heatmap.

20. The apparatus of claim 17, wherein the processing circuitry is further configured to:
validate the UE;
in response to validation of the UE as a trusted UE, correlate the new heatmap with the heatmaps received from multiple UEs; and
in response to determination during correlation of a significant difference between the new heatmap and the heatmaps received from multiple UEs, discard the new heatmap and update validity of the UE as an untrusted UE.

21. The apparatus of claim 17, wherein the contextual data contains sensor information of the UE, the sensor information selected from a set of sensor information that includes ambient temperature and humidity, Lidar information, acoustic information, and timing information that indicates when each portion of the new heatmap was generated.

22. At least one non-transitory computer-readable storage medium that stores instructions for execution by one or more processors of a user equipment (UE), the one or more processors to configure the UE to, when the instructions are executed:
- transmit a new heatmap of an indoor structure to a remote radio unit (RRU) of a private next generation (NG) network, the new heatmap containing:
  - data pairs of a location within the indoor structure and a pathloss associated with the location, the location being a three dimensional (3D) distance from a remote radio unit (RRU), the pathloss calculated based on the 3D distance, and
  - context data associated with the new heatmap; and
- receive, from the RRU, a federated heatmap that includes heatmaps having the context data and received at the RRU from multiple UEs.

23. The at least one non-transitory computer-readable storage medium of claim 22, wherein the one or more processors to configure the UE to, when the instructions are executed, read data from an L1 layer from both a NG modem and a WiFi modem and report the data to the RRU as the new heatmap only on an application layer, the data from the L1 layer of the NG modem received from the RRU, the data from the L1 layer of the WiFi modem received from at least one reference point (RP) at a different location from the RRU.

* * * * *